(12) United States Patent
Shimoff et al.

(10) Patent No.: US 8,452,667 B1
(45) Date of Patent: May 28, 2013

(54) SYSTEM AND METHOD FOR ONLINE MANAGEMENT OF RESTAURANT ORDERS

(75) Inventors: Jared Richmond Shimoff, Redlands, CA (US); John Christopher Easley, San Bernardino, CA (US); Gabriel Thomas Moothart, Corona, CA (US); Mark Allen Birchem, Wakefield, MA (US); Brandon Casci, Somerville, MA (US)

(73) Assignee: Netwaiter, LLC, Redlands, CA (US)

( * ) Notice: Subject to any disclaimer, the term of this patent is extended or adjusted under 35 U.S.C. 154(b) by 1527 days.

(21) Appl. No.: 11/148,984

(22) Filed: Jun. 9, 2005

Related U.S. Application Data

(60) Provisional application No. 60/622,837, filed on Oct. 28, 2004.

(51) Int. Cl.
*G06Q 30/00* (2012.01)

(52) U.S. Cl.
USPC ...................................... 705/26.41; 705/26.1

(58) Field of Classification Search
USPC ........................................... 705/26, 27, 26.1
See application file for complete search history.

(56) References Cited

U.S. PATENT DOCUMENTS

| | | | | |
|---|---|---|---|---|
| 5,991,739 A | * | 11/1999 | Cupps et al. | 705/26 |
| 7,287,002 B1 | * | 10/2007 | Asher et al. | 705/26 |
| 2002/0013730 A1 | * | 1/2002 | Bigus | 705/15 |
| 2002/0013734 A1 | * | 1/2002 | Bueno | 705/26 |
| 2002/0178073 A1 | * | 11/2002 | Gravelle | 705/26 |
| 2004/0249724 A1 | * | 12/2004 | Gosewehr | 705/26 |
| 2005/0004843 A1 | * | 1/2005 | Heflin | 705/15 |
| 2005/0015256 A1 | | 1/2005 | Kargman | |
| 2005/0080686 A1 | * | 4/2005 | Fallon et al. | 705/26 |
| 2005/0182680 A1 | * | 8/2005 | Jones et al. | 705/15 |

FOREIGN PATENT DOCUMENTS

WO  WO 0041102 A2 * 7/2000

OTHER PUBLICATIONS

Business editors, "Gazelle Systems Partners with Food.com to Speed Web-Enables Take-Out," Business Wire, New York, Nov. 2, 1999, p. 1.*
pizzajoe.co.uk, Published in: Internet.
Restaurant Runners, Published in: Internet.
waiter.com, Published in: Internet.

* cited by examiner

*Primary Examiner* — Amee A Shah
(74) *Attorney, Agent, or Firm* — Klein, O'Neill & Singh, LLP

(57) ABSTRACT

A system and method for online management of restaurant orders may comprise of a server computer for storing data related to a plurality of vendors; a client computer for sending a request for vendor product to the server computer; and a vendor point of sale system, at a specific location, for interfacing with the server computer and for processing the request.

9 Claims, 18 Drawing Sheets

| SOUPS & SALADS | PASTAS | STEAKS & SEAFOOD |
| KIDS MENU | DESSERTS |

SOUPS & SALADS
Add your choice of soup to any salad for $2.25

MINESTRONE SOUP

Our hearty broth loaded with a collection of vegetables and pasta.
Ingredients:

Cup $ 3.25
Bowl $ 5.25

| Add Cup | Add Bowl |

| Qty | Item | Item Price |

Sub-Total:$0.00
Tax(7.75%): $0.00
Total:$0.00

BBQ CHICKEN CHOPPED SALAD

Grilled BBQ chicken breast with a mixture of tomatoes, corn, green onions, black beans, jicama, cilantro, corn, tortilla strips, mozzarella cheese, iceberg lettuce, and Jakes original BBQ ranch dressing.

FIGURE 8 C(i)

We noticed you did not order any APPETIZERS. Would you like to add any of the following items?

AVOCADO ROLLS         $6.95
(Not served before 11.00 AM)
Crispy golden wantons wrap a tantalizing blend of avocado, cream cheese, sun dried tomatoes, red onions, cilantro, pine nuts, chipotle pepper and spices.
Served with a sweet tamarind sauce.
Ingredients:

| Qty | Item | Item Price |
| 1 | PASTA LUNCH SPECIAL | $11.20 |

Sub-Total:$11.20
Tax(7.75%): $0.87
Total:$12.07

| Add |

Ingredients:

JALAPENO POPPERS    $6.25
(Served upto 3:00 PM)

FIGURE 8 C(ii)

FIGURE 8 C(iii)

Great Choice! Would you like to add additional items?

AVOCADO ROLLS $6.95

(Not served before 11.00 AM)
Crispy golden wantons wrap a tantalizing
blend of avocado ,cream cheese,
sun dried tomatoes, red onions, cilantro,
pine nuts, chipotle pepper and spices.
Served with a sweet tamarind sauce.
Ingredients

| Qty | Item | Item Price |
|---|---|---|
| 1 | PASTA LUNCH SPECIAL | $11.20 |
| 1 | AVOCADO ROLLS | $6.95 |

Add

Sub-Total:$18.15
Tax(7.75%): $1.41
Total:$19.56

Ingredients

JALAPENO POPPERS $6.25

FIGURE 8 D

Enter Payment Information:

NOTE: Your payment information is used solely for authentication purposes. You will be asked for payment at the restaurant.

Cardholder Name: Office
Credit Card Type: Discover
Credit card number: 8888888888888888
Expiration: 04 / 2008

Confirm Order:

| Qty | Item | Item Price | |
|---|---|---|---|
| 1 | PASTA LUNCH SPECIAL<br>Select Pasta: GRILLED CHICKEN PASTA<br>Would you like to add soup or salad to your order?<br>(add an additional $2.25):Green Salad<br>(add $2.25 ea.)<br>Special Instructions: | $11.20 | Edit | Delete |
| 1 | AVOCADO ROLLS<br>Special Instructions: | $6.95 | Edit | Delete |

Sub-Total: $18.15
Tax(7.75%): $ 1.41
Total: $19.56

[ Place Order ]  [ Edit Order ]

FIGURE 8 F

| RESTAURANT/BREWERY/BREWHOUSE |
|---|

Thank you! Your order has been received.

- You will pay for your order at the restaurant. Your payment information was used solely for authentication purposes.

- Your order has been placed under the name below.

Office

Discover *********** 8888
Exp. Date 04/2008
Your food will be ready in 0 Hours(s) and 50 Minute(s) at:

Famous Bar & Grill
100 Elm Street
San Bernardino CA 92401
(123) 456-78
Get Map to Restaurant
Create a                    Account

| Qty | Item | Item Price |
|---|---|---|
| 1 | PASTA LUNCH SPECIAL | $11.20 |
| | Select Pasta: GRILLED CHICKEN PASTA<br>Would you like to add soup or salad to your order?<br>(add an additional $2.25):Green Salad (add $2.25 ea.)<br><br>Special Instructions: | |
| 1 | AVOCADO ROLLS | $6.95 |
| | Special Instructions: | |

Sub-Total:$18.15
Tax(7.75%):$ 1.41
Total:$19.56
Print

FIGURE 8 H

SYSTEM AND METHOD FOR ONLINE MANAGEMENT OF RESTAURANT ORDERS

CROSS-REFERENCE TO RELATED APPLICATIONS

This application claims the benefit, under 35 U.S.C. §119 (e), of U.S. Provisional Patent Application No. 60/622,837, filed on Oct. 28, 2004, the disclosure of which is incorporated herein in its entirety.

BACKGROUND OF THE INVENTION

1. Field of the Invention

The present invention relates to systems and methods for electronic commerce, and more particularly to an online ordering mechanism.

2. Background

Several online (such as, Internet) services provide consumers with access to menus for food products that can be ordered online.

World Wide Waiters is one such service in which each consumer and participating restaurants are linked via the Internet to a World Wide Waiter server. The World Wide Waiter server provides a web site (located at www.waiter.com) that includes web pages having menus of several participating restaurants with home delivery and/or take-out service. The consumer can search for a menu either using a restaurant's name or a city.

The consumer can then place an order from the menu of a selected restaurant that is then transferred to a World Wide Waiter central server. The World Wide Waiter server then emails the order over the Internet to the restaurant. The restaurant confirms the order to the World Wide Waiter server. Upon receiving the restaurant's confirmation, the World Wide Waiter server transmits to the consumer a confirming email that the restaurant has received the order and will deliver the order or prepare the consumer's order for takeout service.

In addition, World Wide Waiter's system allows a customer to fax the order directly to the World Wide Waiter office. Personnel at the World Wide Waiters office contact the restaurant in order to process the order.

There are several shortcomings to this system. For example, the World Wide Waiter server downloads to the customer statically created HTML pages representing the menus of each participating restaurant. These menu web pages are preconfigured and stored in the server. The use of these statically configured menu web pages becomes a burden since it hampers the maintainability and scalability of the server to take on additional restaurants.

Waiters on Wheels is another Internet online ordering service that provides Internet consumers with a web site to advertise menus of participating restaurants and that accepts consumer orders. It faxes an order to a participating restaurant. It provides its own waiters that pick up the take-out order from a participating restaurant and deliver it to the consumer's location.

The menus are stored by the geographic location of a Waiters on Wheels office. A consumer searches those menus associated with the Waiters on Wheels office within their delivery location. A consumer can order online from the menu. The Waiters on Wheels server confirms receipt of the consumer's order by telephone. If the restaurant cannot deliver the order to the Internet consumer, the restaurant telephones the Waiters on Wheels office. The office in turn calls the consumer to inform them of the problem.

PizzaNet is another conventional online ordering system that provides Internet consumers with a web site (located at www.pizzanet-uk.com) that includes menus of participating pizza restaurants. To place an order, consumers enter their zip code, telephone area code, and the first three digits of their phone number. A list of participating pizza restaurants within the consumer's location is provided along with the participating restaurants' menus. The consumer can then select the restaurant of his or her choice and order from its menu. PizzaNet receives the order from the Internet and faxes to the restaurant a copy of the order. In some instances, PizzaNet verifies the order by a return phone call and in other cases the pizza restaurant verifies the order by return phone call.

The Waiter on Wheels system and the PizzaNet system communicate with restaurants through a facsimile machine or telephone. The additional expense incurred in installing a facsimile machine can deter prospective restaurants from participating in this system. Further, once an order is received, all subsequent communications between the customer and the delivery system are performed via telephone calls, which require manual intervention and the expense of restaurant labor.

Additionally, these conventional systems do not allow for direct integration and communication with a restaurant's point-of-service (or point-of-sale) ("POS") system. Furthermore, these conventional systems do not interact with a restaurant's internal ordering system. Direct integration and communication with the POS would allow for improved communication between the consumer and the restaurant.

Therefore, what is desired is an online ordering system that can integrate, interact, and communicate with a restaurant's POS system. Such a system would offer a gain in efficiency for the consumer to place an order and for the restaurant to process and fulfill the order.

SUMMARY OF THE INVENTION

In one aspect of the present invention, a system for online ordering comprises a server computer for storing data related to a plurality of vendors; a client computer for sending a request for vendor product to the server computer; and a vendor point of sale system, at a specific location, for interfacing with the server computer and for processing the request.

In another aspect of the present invention, a system for online ordering comprises a computer server bank for storing data related to a plurality of vendors; and a plurality of client computers for sending requests for vendor product to the computer server bank and for processing the requests; and a plurality of vendor point of sale systems at specific locations for transmitting the requests to the computer server bank, the vendor point of sale systems interfacing with the computer server bank.

In yet another aspect of the present invention, a system for online ordering comprises a plurality of POS modules for polling a middleware module for new orders; a plurality of POS database servers for receiving orders from the POS modules; and a first web server for receiving a status request from the middleware module; wherein the middleware module sends orders to the POS modules; wherein the POS modules poll the POS database servers to retrieve an indication of success or failure; and wherein the POS modules send an indication of a success or failure to the middleware module.

The present invention offers a gain in efficiency over conventional ordering systems. Unlike conventional systems, the present invention integrates the ordering process with POS systems for each restaurant, making remote ordering to become an efficient process. A gain in efficiency is realized for the consumer when placing an order and for the restaurant when processing and fulfilling the order.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
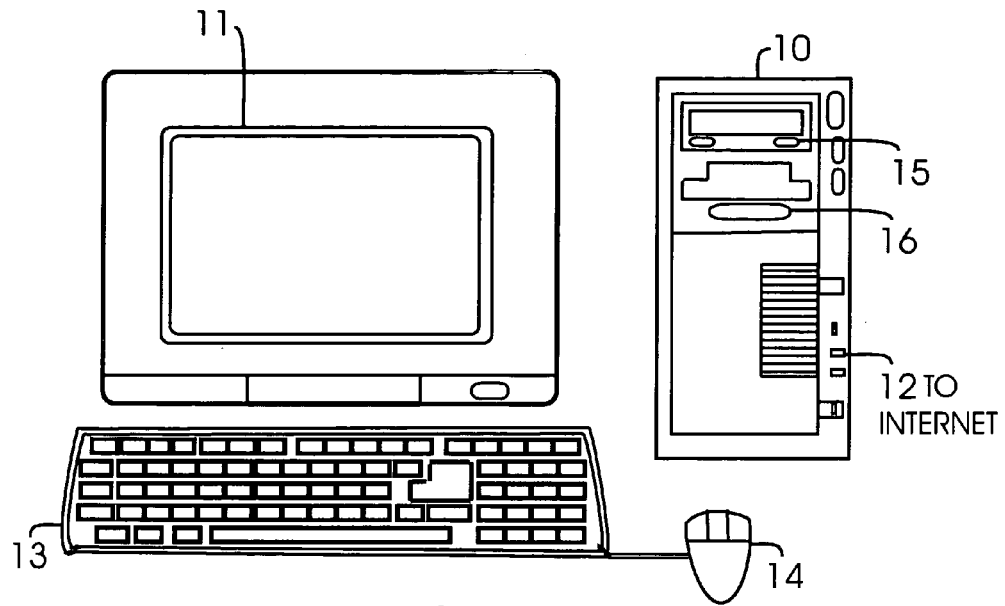
FIG. 1 is a block diagram of a computing system for executing computer executable process steps according to one embodiment of the present invention.

FIG. 1 is a block diagram of a computing system for executing computer executable process steps according to one embodiment of the present invention. FIG. 1 includes a host computer 10 and a monitor 11. Monitor 11 may be a CRT type, an LCD type, or any other type of color or monochrome display. Also provided with computer 10 may be a keyboard 13 for entering text data and user commands, and a pointing device 14 (such as a mouse) for processing objects displayed on monitor 11.

Computer 10 may include a computer-readable memory medium such as a rotating disk 15 for storing readable data. Besides other programs, disk 15 can store application programs including web browsers by which computer 10 connects to the Internet and the systems described below, according to one aspect of the present invention.

Computer 10 can also access a computer-readable floppy disk storing data files, application program files, and computer executable process steps embodying the present invention or the like via a floppy disk drive 16. A CD-ROM interface (not shown) may also be provided with computer 10 to access application program files, audio files and data files stored on a CD-ROM.

A modem, an integrated services digital network (ISDN) connection, or the like may also provide computer 10 with an Internet connection 12 to the World Wide Web ("WWW"). An Internet connection 12 may allow the computer 10 to download data files, audio files, application program files and computer-executable process steps embodying the present invention.

Figure 2:
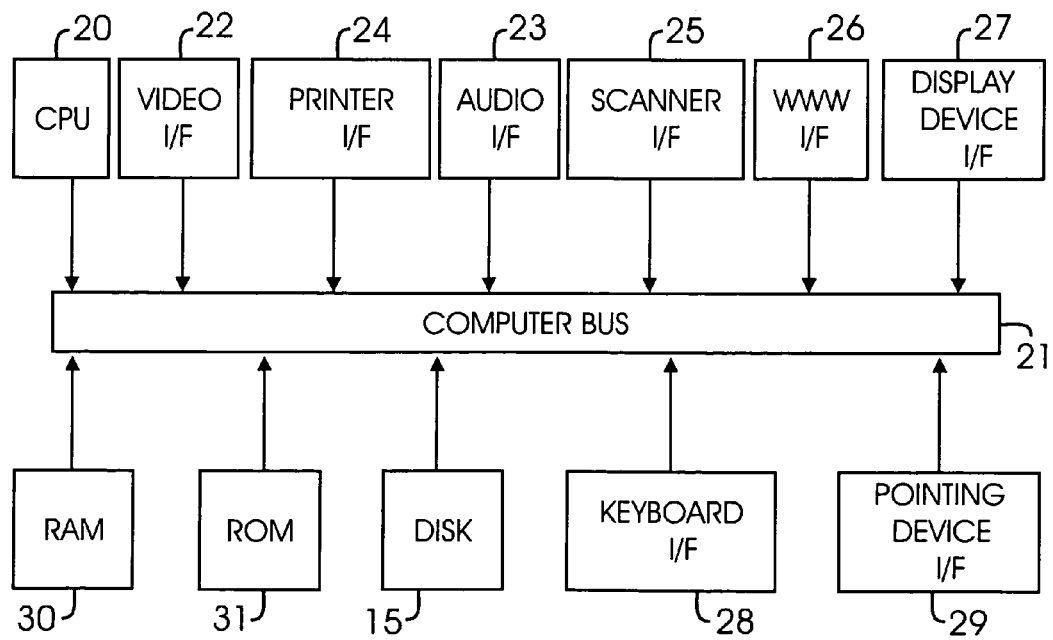
FIG. 2 is a block diagram showing the internal functional architecture of the computing system in FIG. 1.

FIG. 2 is a block diagram showing the internal functional architecture of computer 10. As shown in FIG. 2, computer 10 may include a CPU 20 for executing computer-executable process steps and interfaces with a computer bus 21. Also shown in FIG. 2 are a WWW interface 26, a display device interface 27, a keyboard interface 28, a pointing device interface 29, an audio interface 23, and a rotating disk 15.

As described above, disk 15 may store operating system program files, application program files, web browsers, and other files. Some of these files may be stored on disk 15 using an installation program. For example, CPU 20 may execute computer-executable process steps of an installation program so that CPU 20 can properly execute the application program.

A random access main memory ("RAM") 30 may also interface to computer bus 21 to provide CPU 20 with access to memory storage. When executing stored computer-executable process steps from disk 15 (or other storage media such as floppy disk 16, shown in FIG. 1, or WWW connection 12, shown in FIG. 1), CPU 20 stores and executes the process steps out of RAM 30.

Read only memory ("ROM") 31 may be provided to store invariant instruction sequences such as start-up instruction sequences or basic input/output operating system (BIOS) sequences for operation of keyboard 13.

Figure 3:
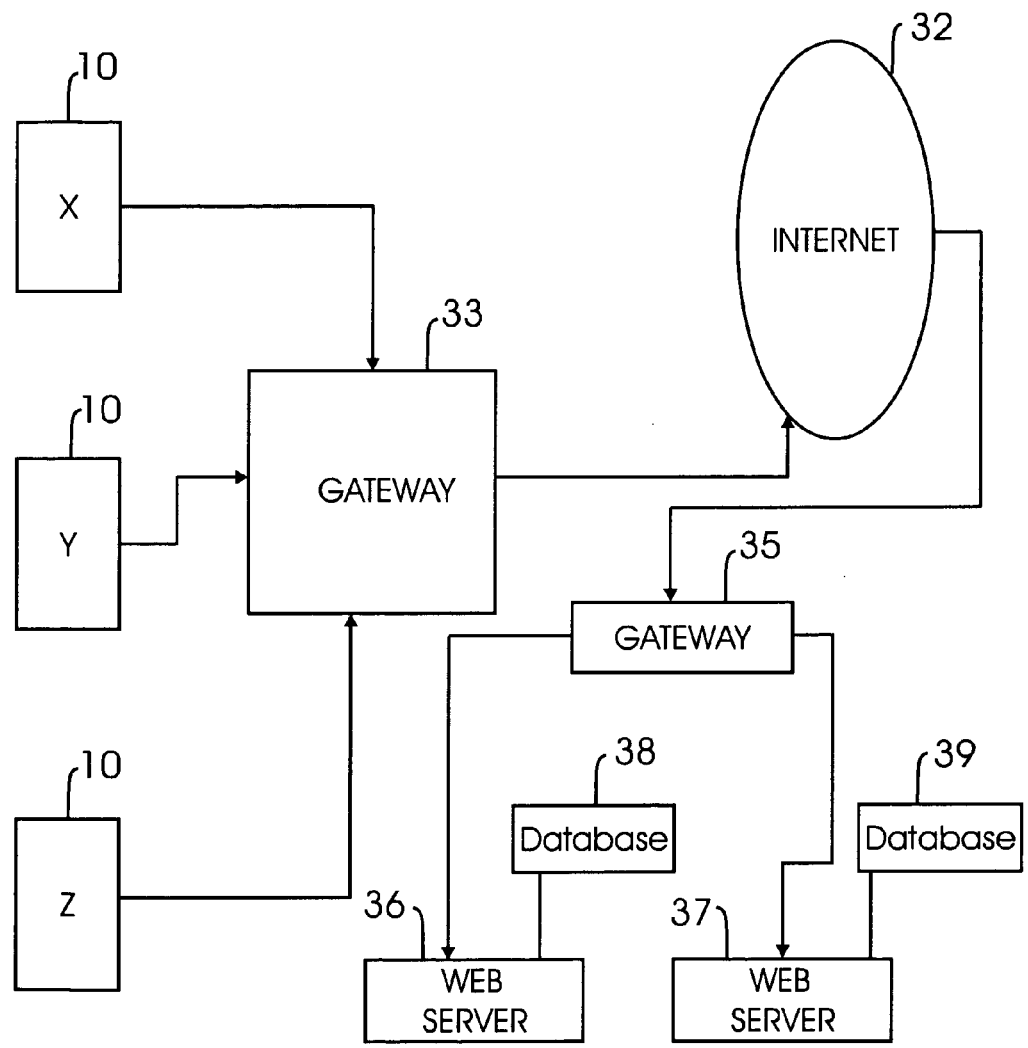
FIG. 3 is a block diagram of a typical topology of a computer network with computers used, according to one embodiment of the present invention.

FIG. 3 shows a typical topology of a computer network with computers similar to computer 10, connected to the Internet. For illustration purposes, three computers X, Y, and Z are shown connected to the Internet 32 via Web interface 26 (shown in FIG. 2) through a gateway 33, where gateway 33 can interface N number of computers. Web interface 26 may be a modem, network interface card, or a unit for providing connectivity to other computer systems over a network using protocols such as X.25, Ethernet, or TCP/IP, or any device that allows, directly or indirectly, computer-to-computer communications.

It is noteworthy that the invention is not limited to a particular number of computers. Any number of computers that can be connected to the Internet 32 or any other computer network may be used.

FIG. 3 further shows a second gateway 35 that may connect a network of web servers 36 and 37 to the Internet 32. Web servers 36 and 37 may be connected with each other over a computer network. Web servers 36 and 37 can provide content, including restaurant menus, to a user from database 38 and/or 39. Web servers 36 and 37 can also host the present online ordering system, according to the present invention.

The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language ("XML") as published by W3C Consortium, Version 1, Second Edition, October 2000, ©W3C may also be used. The collection of all such publicly available computer files is known as the World Wide Web ("WWW"). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as AMERICA ONLINE or COMPUSERVE, or via an Internet Service Provider, e.g., EARTHLINK. The web browser may run on any computer connected to the Internet. Currently, various browsers are available of which two prominent browsers are NETSCAPE NAVIGATOR and MICROSOFT INTERNET EXPLORER. The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Figure 4:
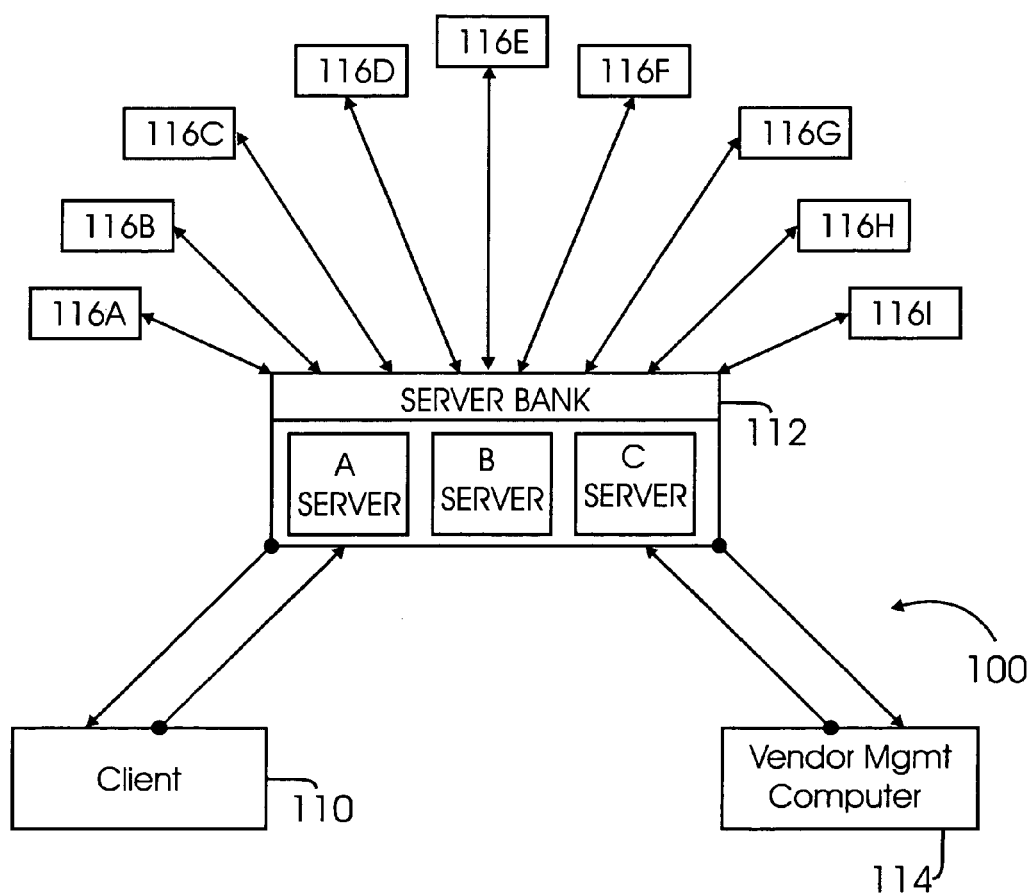
FIG. 4 is a block diagram of a system for managing online orders, according to one embodiment of the present invention.

FIG. 4 shows a system 100 for managing online orders. Computer server bank 112 may include multiple server computers ("servers") for processing information requests between client computers 110 and vendor management computers 114. Although FIG. 4 shows an exemplary computer server bank 112 to include three servers A, B, and C, any number of servers may be used.

Continuing with FIG. 4, the server bank 112 may be attached to a communication link (such as the Internet or an intranet) with multiple vendor locations (such as restaurants) 116A-116I. Although FIG. 4 shows an exemplary group of nine vendor locations 116A-116I, any number of vendor locations may be used.

Although the following discussion may use examples involving restaurants, it is to be understood that the present invention may be used for facilitating orders, retail or wholesale, between any type of customers and vendors. The system 100 may be a web-based food ordering system that facilitates online orders for restaurants. Customers may place food orders online using client computers 110, which may use a computer-readable medium. Customers may access a website managed by a particular chain of restaurants. From the restaurant website, customers may choose a specific restaurant within the chain (for example, restaurant 116D), view the menu, and place a food order.

The server bank 112 may acknowledge the customers' orders and suggest that the customer order additional items. For example, when a customer orders an entrée, the system 100 may ask the customer to order an appetizer, dessert, or beverage. Once the customer has completed the order, the customer may send the order, via a communication link, to the server bank for further transmission to the POS system of the chosen restaurant (for example, restaurant 116D).

The customer may make payment for the food order online, in which the payment may be directed to the POS system of the chosen restaurant. Alternatively, the customer may elect to make payment in person upon picking up the order from the selected restaurant. Not all POS systems are capable of processing payments. For fraud prevention purposes, orders and associated payments (whether online or otherwise) may be verified. The order information may be sent to the kitchen of the selected restaurant. An order confirmation may be sent to the customer. The customer may print a receipt with an order confirmation number (if an order confirmation number can be retrieved from the POS) and an estimated pick-up time.

Figure 5A:
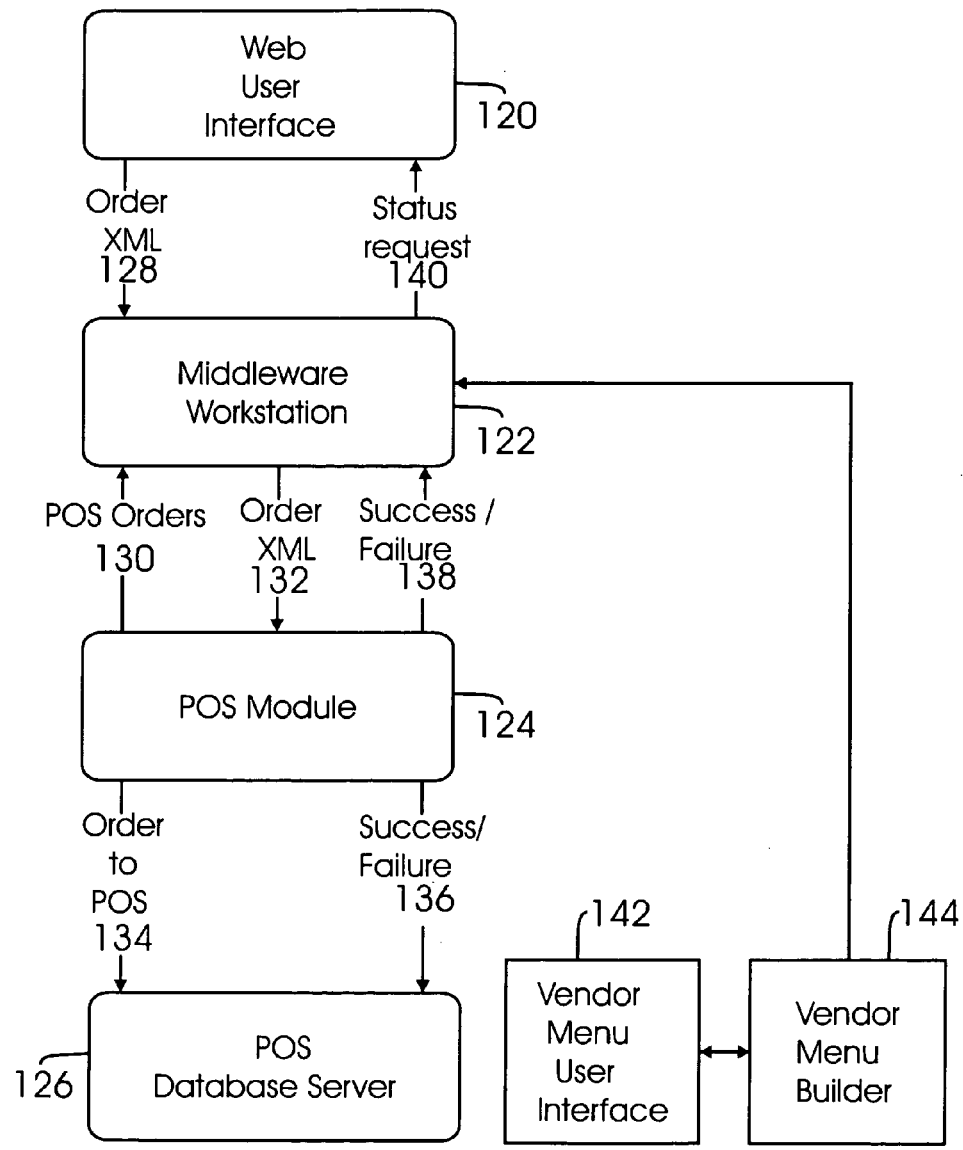
FIG. 5A is a block diagram of a system for managing online orders, according to another embodiment of the present invention.

The management of online orders may be further understood with reference to FIG. 5A which shows a block diagram of a system comprising a web user interface, 120, a middleware module 122 (such as a middleware workstation), a POS module 124, a POS database server 126, a vendor menu user interface 142, and a vendor menu builder 144. The web user interface 120 may be displayed on the client computer 110 (shown in FIGS. 1 and 4) or stored on a computer-readable medium. The middleware module 122 may serve as a bridge between the web user interface 120 and the POS module 124. Also, the POS module 124 may serve as a bridge between the middleware module 122 and the POS database server 126, which may be located at the physical restaurant location. A step 128 may comprise sending the food order in XML format to the middleware module 122.

The middleware module 122 may manage several webservices. For example, services that process requests from the POS module 124 (or an interface to a POS module) for fulfilling orders, via the Internet, to restaurants with POS systems enabled to communicate with the system 100 (shown in FIG. 4). The middleware module 122 may respond to a well-defined and documented set of Web Service Description Language ("WSDL") commands and transport mechanism using the WS-Security 2.0 specifications for SOAP Web-Services over HTTP. Messages between the web service and the customers may be authenticated, encrypted, and signed.

FIG. 5A also shows process steps for using the overall online ordering system. A step 130 may comprise polling the middleware module 122 for new orders. Thereafter, a step 132 may comprise sending an order from the middleware module 122 in XML format to the POS module 124. Then a step 134 may comprise sending the order from the POS module 124 to the POS database server 126.

A step 136 may comprise the POS module 124 polling the POS database server 126 to retrieve an indication of success or failure. Next, a step 138 may comprise sending an indication of a success or failure from the POS module 124 to the middleware module 122. A step 140 may then comprise sending a status request from the middleware module 122 to the web user interface 120. Alternatively, the step 140 may comprise the web user interface 120 polling the middleware module 122 for the status request.

The vendor menu user interface 142 and the vendor menu builder 144 may interface with the middleware module 122. Through the vendor menu user interface 142, a restaurant manager may use the vendor menu builder 144 to add, update, or change a given location's menu. The vendor menu user interface 142 and the vendor menu builder 144 may be accessed through a web user interface (not necessarily the web user interface 120). A request may be made from the middleware module 122 to add, update, or change a given location's menu. The request may contain a location ID and a menu in XML format. If the request is successful, nothing is returned. If an error occurs in adding, updating, or changing a menu, then a SOAP exception may be returned. The error could be due to a missing menu parameter or invalid location.

Figure 5B:
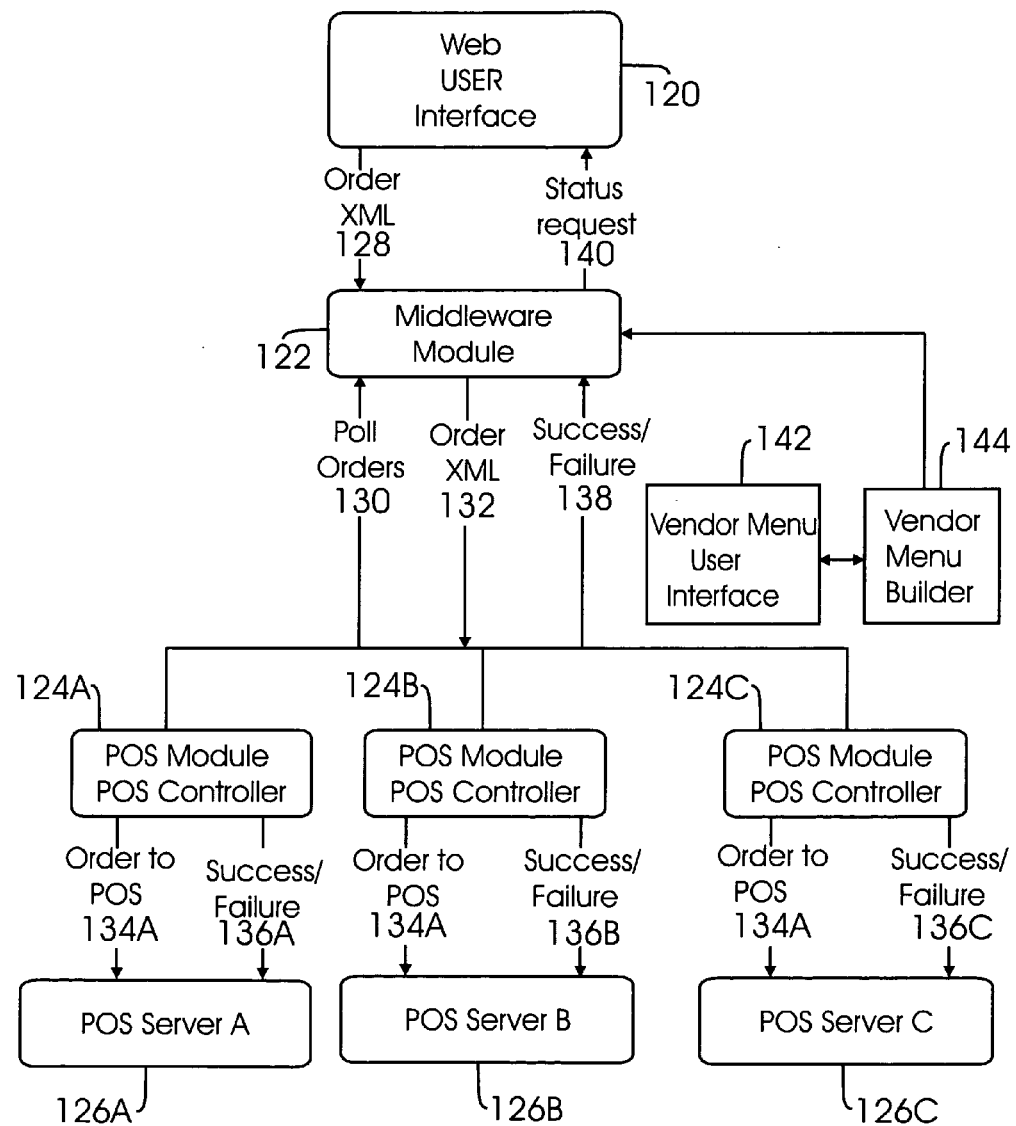
FIG. 5B is a block diagram of a system for managing online orders, according to yet another embodiment of the present invention.

Another embodiment of the present invention for the management of online orders may be understood with reference to FIG. 5B which shows a block diagram of a system comprising a web user interface 120, a middleware module 122, POS modules (124A, 124B, and 124C), POS database servers (126A, 126B, 126C), a vendor menu user interface 142, and a vendor menu builder 144. The embodiment in FIG. 5B operates similarly to the embodiment described above regarding FIG. 5A, with a plurality of POS modules 124A-C and a plurality of POS servers 126A-C. For example, steps 134A and 136A are similar to steps 134 and 136.

Figure 6:
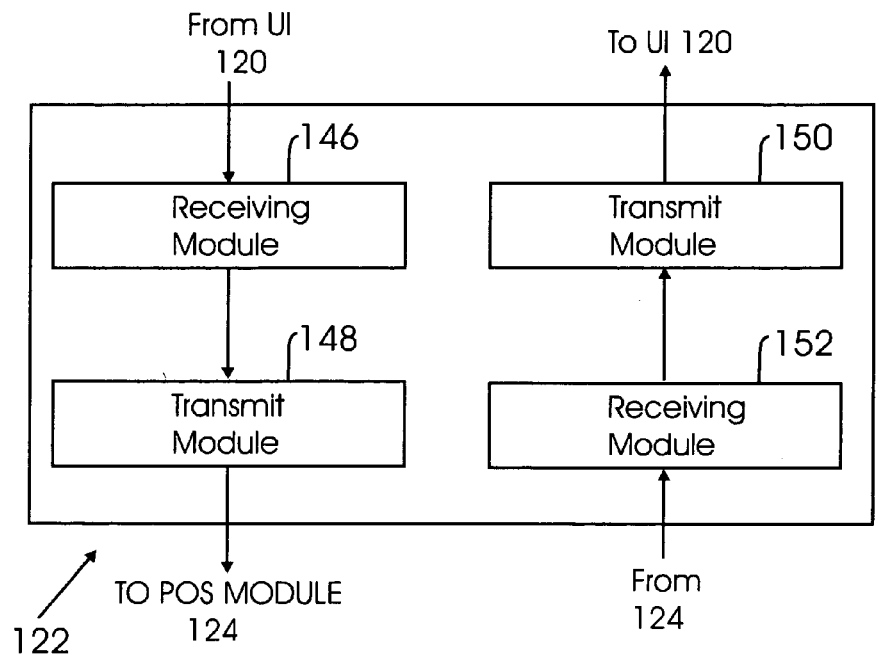
FIG. 6 is a block diagram of a middleware module, according to one aspect of the present invention.

The middleware module 122 may be further understood with reference to FIG. 6. The middleware module 122 may comprise a receiving module 146 that receives information from user interface 120 and a transmitting module 148 that transmits information to the POS module 124. To receive communication/commands from the POS module, a receiving module 152 is provided that transmits information to user interface 120 via a transmitting module 150.

Figure 7:
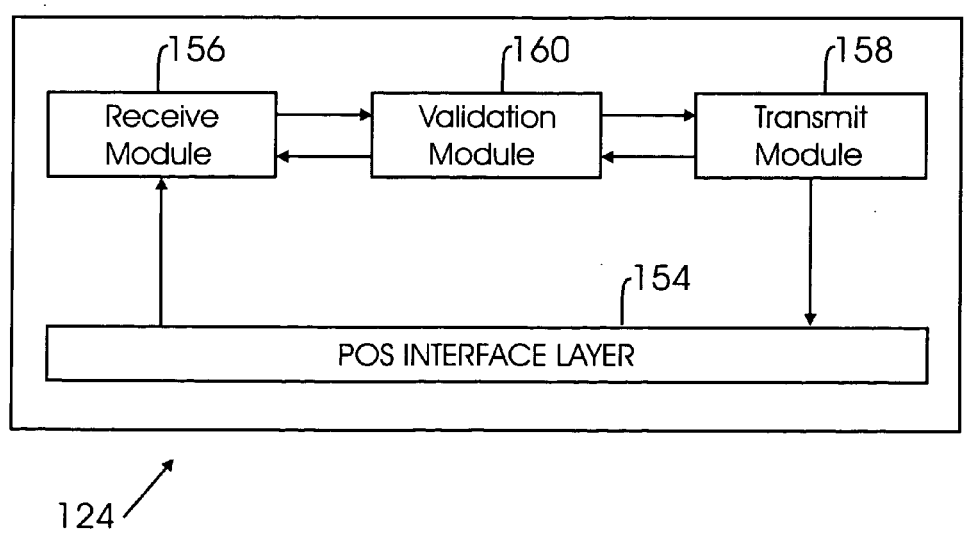
FIG. 7 is a block diagram of a POS module, according to another aspect of the present invention.

FIG. 7 shows POS module 124. The POS module 124 may comprise an interface layer 154, a receiving module 156, a transmitting module 158, and a validation module 160. The validation module 160 may serve to validate food orders, such as, for payment, menu availability, customer confirmation, and geographic location. When an order is placed into the middleware module 122, the order may be placed into a queue, containing a location ID that may be later processed by the interface layer 154 that corresponds to the location ID. If there is an error, then a SOAP exception may be sent to the middleware module 122.

Figure 8:
FIGS. 8A-8H show screen shots for using the process steps, according to one aspect of the present invention.
Figure 8:
Figure 8:
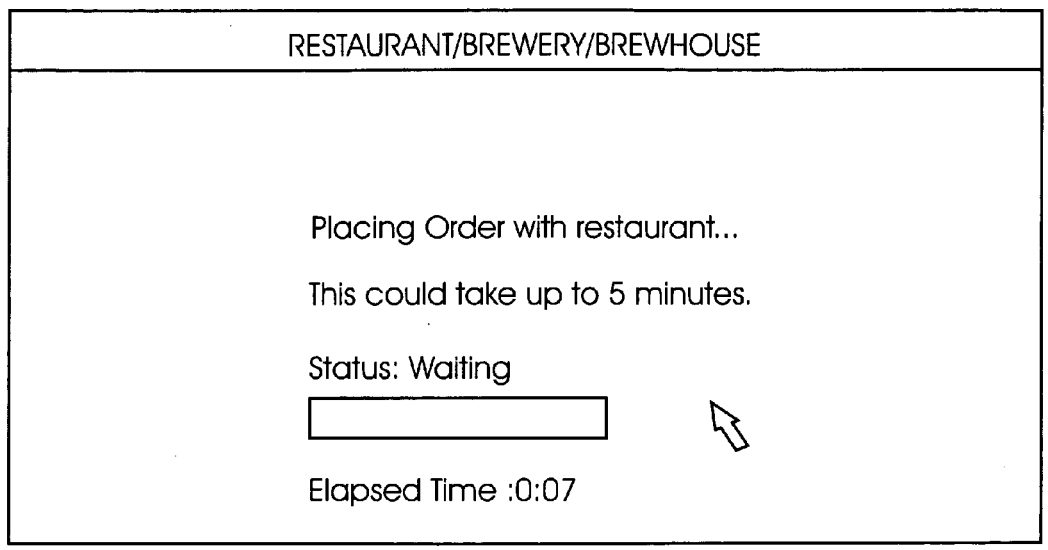

FIGS. 8A-8H show various screen shots from user interface 120 using the foregoing adaptive aspects of the present invention. For example, FIG. 8A shows a screen shot displayed when beginning the process of online ordering. As seen in FIG. 8A, geographic searches may be conducted to locate local restaurants. FIG. 8B shows an exemplary listing of search results.

FIG. 8C(i) shows an exemplary food order, listing prices, food ingredients, links for other food choices, suggestions for additional items ("upselling"), and other useful information. FIG. 8C(ii) shows a display of an exemplary effort at upselling. FIG. 8C(iii) shows an exemplary display of a screen shot providing, for example, promotional offer choices, an area for providing special instructions, and links for proceeding with an order or canceling an order. FIG. 8D shows an exemplary intermediate screen shot that provides an order sub-total and a featured food suggestion. FIG. 8E shows an exemplary screen shot prompting entry of login information, password, and other identifying information. One may enter car identifying information (such as make, model, and license plate number) to assist the restaurant in identifying a customer at the restaurant premises. FIG. 8F shows an exemplary screen shot displaying a confirmation of the items ordered and fields for entering payment information. An exemplary screen shot indicating that the order is pending is shown in FIG. 8G.

An order confirmation may be shown in an exemplary screen shot shown in FIG. 8H. The customer may review payment instructions, an estimated time at when the order is expected to be ready, restaurant address information, a listing of the ordered items, an option to print the screen shot display, and other useful information.

Figure 9:
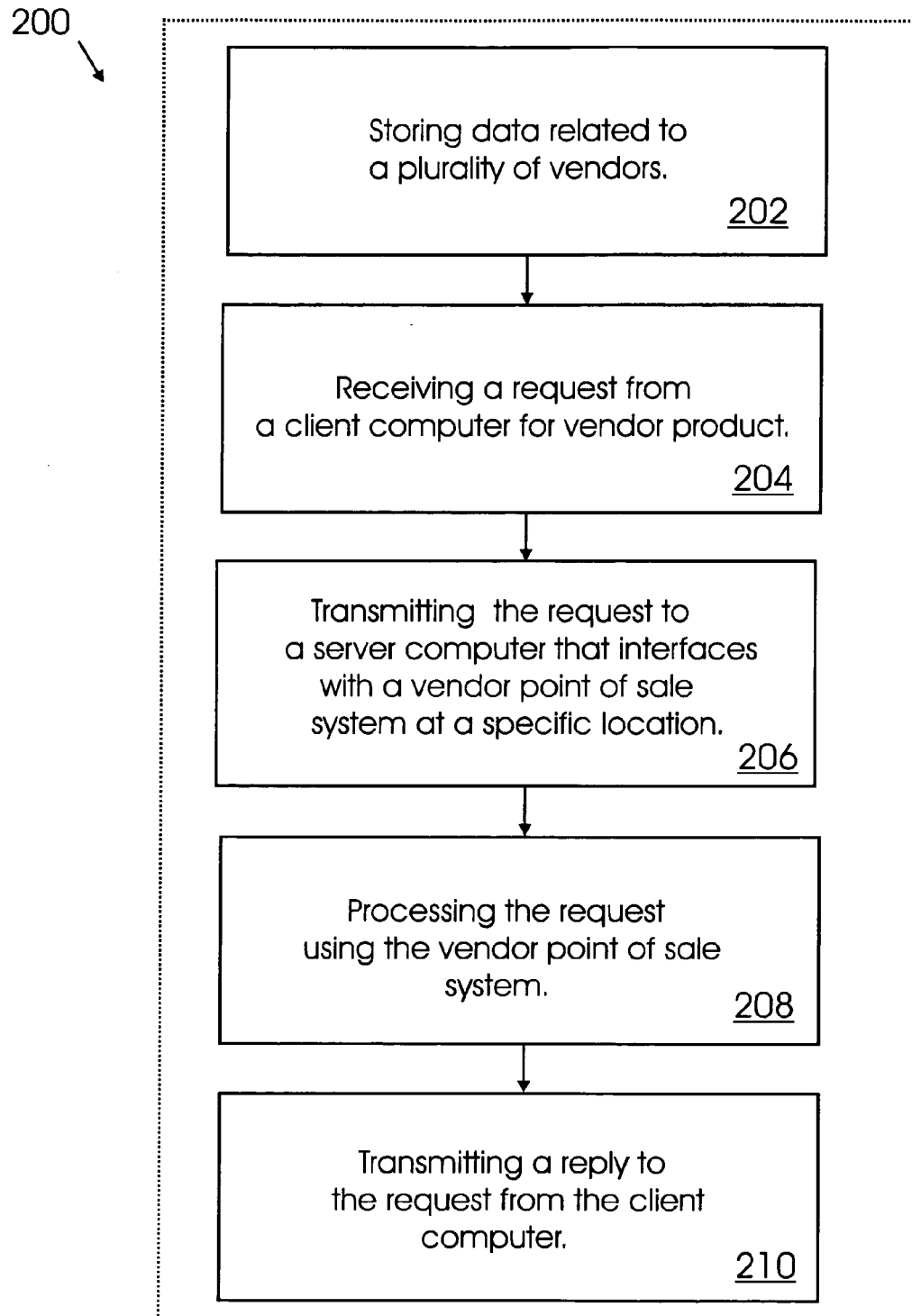
FIG. 9 schematically represents a series of steps of a method for online ordering, according to another embodiment of the present invention.
Figure 10:
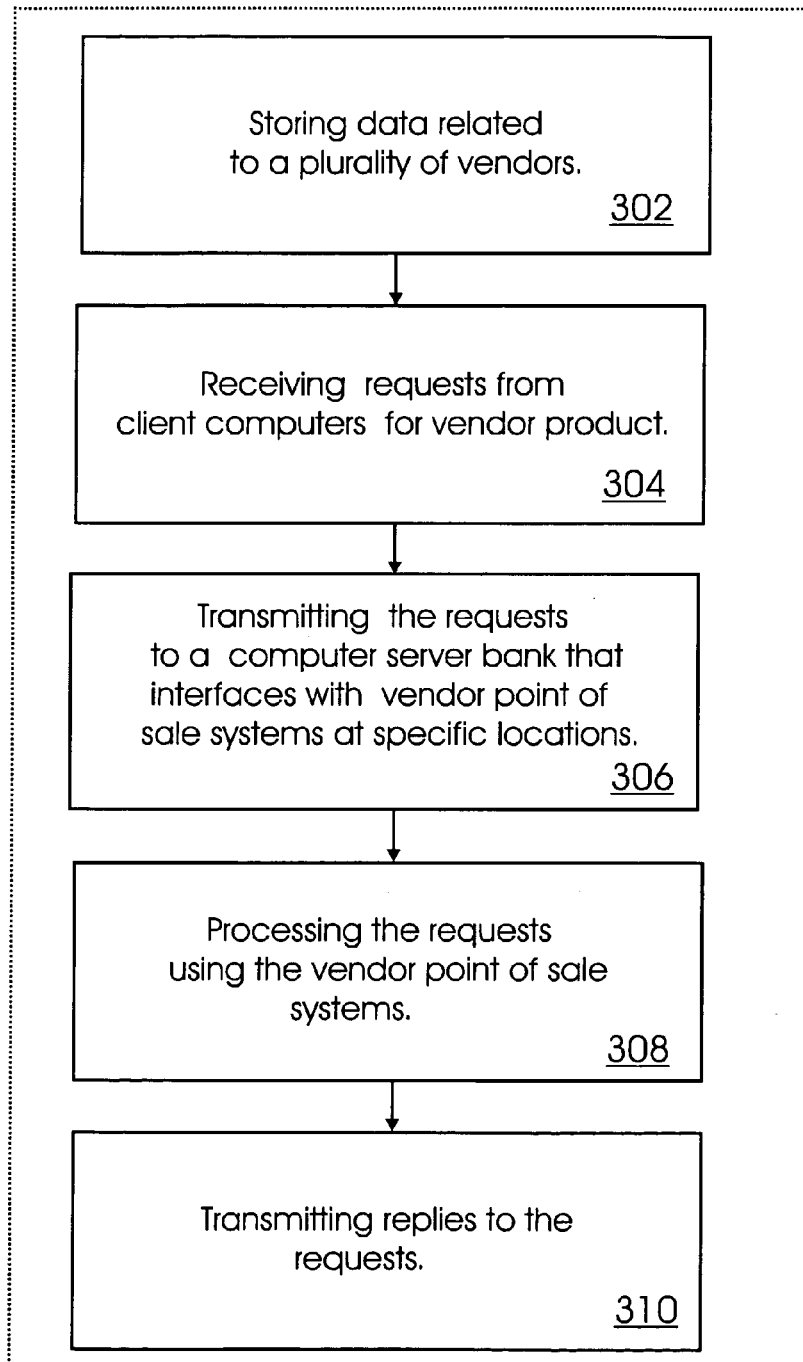
FIG. 10 schematically represents a series of steps of a method for online ordering, according to still another embodiment of the present invention.
Figure 11:
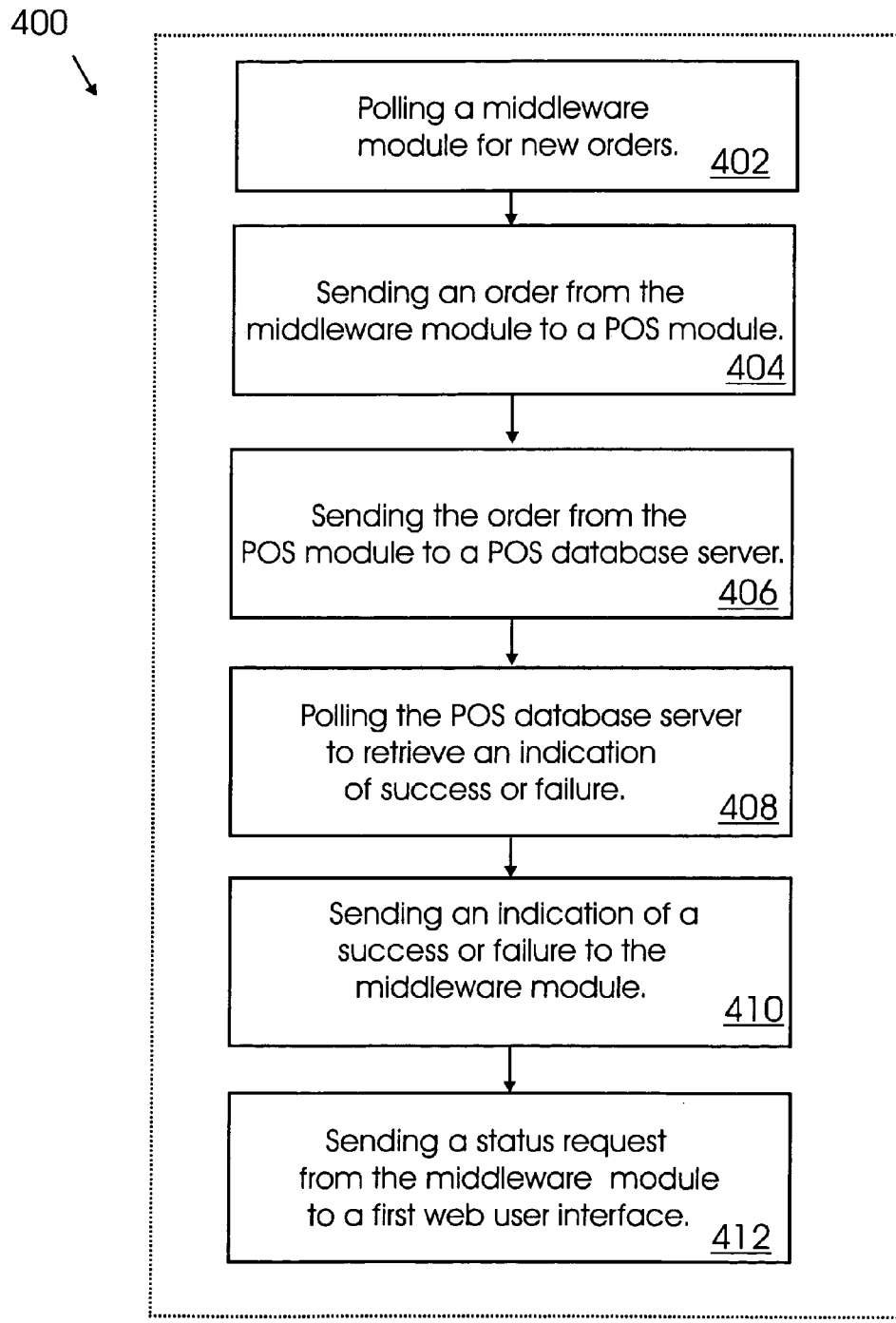
FIG. 11 schematically represents a series of steps of a method for online ordering, according to yet another embodiment of the present invention.

It can be seen in FIGS. 9-11 that the present invention includes further methods of managing an online ordering system. For example, FIG. 9 shows a method 200 for online ordering comprising of a step 202 of storing data related to a plurality of vendors. A step 204 may comprise receiving a request from a client computer for vendor product. Next, a step 206 may comprise transmitting the request to a server computer that interfaces with a vendor point of sale system at a specific location. A step 208 may comprise processing the request using the vendor point of sale system and a step 210 may comprise transmitting a reply to the request from the client computer.

FIG. 10 shows a method 300 for online ordering. The method 300 may comprise a step 302 of storing data related to a plurality of vendors. A step 304 may comprise receiving requests from client computers for vendor product. Next, a step 306 may comprise transmitting the requests to a computer server bank that interfaces with vendor point of sale systems at specific locations. A step 308 may comprise processing the requests using the vendor point of sale systems and a step 310 may comprise transmitting replies to the requests.

FIG. 11 shows a method 400 for online ordering. The method 400 may comprise a step 402 polling a middleware module for new orders. A step 404 may comprise sending an order from the middleware module to a POS module. Next, a step 406 may comprise sending the order from the POS module to a POS database server. A step 408 may comprise polling the POS database server to retrieve an indication of success or failure. Thereafter, a step 410 may comprise sending an indication of a success or failure to the middleware module while a step 412 may comprise sending a status request from the middleware module to a first web user interface.

Figure 12:
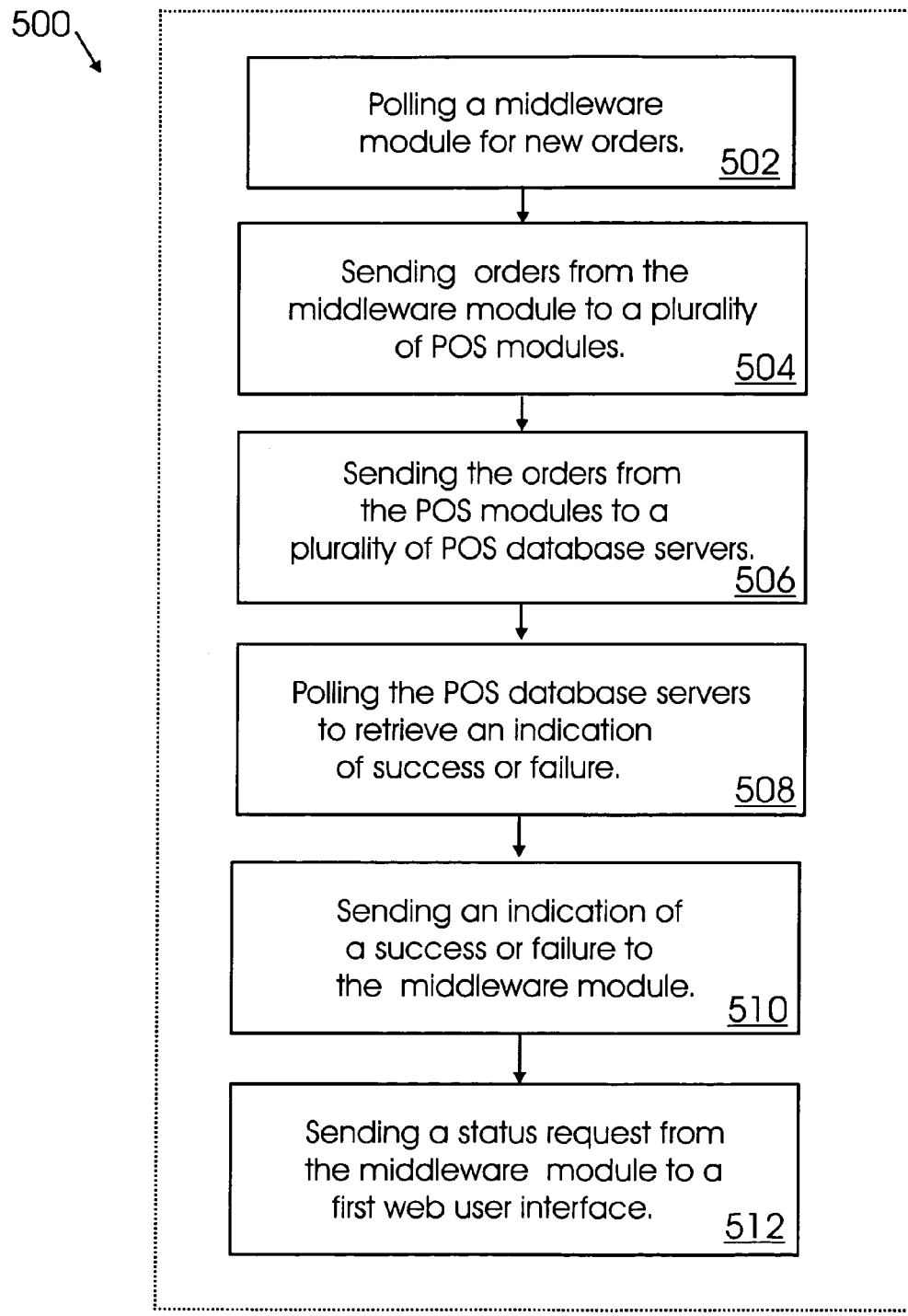
FIG. 12 schematically represents a series of steps of a method for online ordering, according to still yet another embodiment of the present invention.

A method 500 for online ordering is shown in FIG. 12. The method 500 may comprise a step 502 of polling a middleware module for new orders. A step 504 may comprise sending orders from the middleware module to a plurality of POS modules. Thereafter, a step 506 may comprise sending the orders from the POS modules to a plurality of POS database servers. A step 508 may comprise polling the POS database servers to retrieve an indication of success or failure. A step 510 may comprise sending an indication of a success or failure to the middleware module. Next, a step 512 may comprise sending a status request from the middleware module to a first web user interface.

Although the present invention has been described with reference to specific embodiments, these embodiments are illustrative only and not limiting. Many other applications and embodiments of the present invention will be apparent in light of this disclosure and the following claims.

The invention claimed is:

1. A system for online ordering, comprising of:
 a server computer for storing data related to a plurality of vendors; wherein the plurality of vendors using a vendor based user interface controlled by the server computer, upload vendor product information at any given time, for customers to view and order from; wherein the plurality of vendors are restaurants, each identified by a unique identifier;
 a client computer for sending a consumer request for a vendor product to the server computer via a remote network connection; wherein the consumer request is for a food item from one of the restaurants, and based on the ordered food item, the server computer is configured to suggest additional items to the consumer for purchase; and wherein a user interface displayed at the client computer is configured to obtain details from the consumer regarding the request; and to identify the consumer, the details include description of a consumer vehicle that the consumer will use to pick up the vendor product, after the consumer request is accepted; and a vendor point of sale system, at a specific location, for interfacing with the server computer and for processing the request; wherein the vendor point of sale system directly accepts the request for the food item, directly transmits the request to a kitchen that prepares the food item and then transmits a response to the server notifying that the request has been accepted.

2. The system for online ordering of claim 1, wherein the data related to the plurality of vendors is preloaded in the server computer and updated based on vendor input.

3. The system for online ordering of claim 1, wherein the data related to the plurality of vendors comprises a restaurant menu for consumers to view and order food items from.

4. The system for online ordering of claim 3, wherein one or more of the plurality of vendors, at any given time, can make a request to the server computer to add, update, or change a specific location's menu.

5. The system for online ordering of claim 4, wherein the request from one or more of the plurality of vendors includes a location identifier that uniquely identifies the specific location.

6. The system for online ordering of claim 1, wherein the server computer transmits a reply to the request from the vendor point of sale system to the client computer.

7. The system of claim 3, wherein while the consumer is ordering a food item and if the consumer has only ordered an entrée and not an appetizer, the server computer via the user interface is configured to prompt the consumer to order an appetizer.

8. A system for online ordering, comprising:

a server computer for storing restaurant menus from a plurality of restaurants; wherein each restaurant identified by a unique location identifier is provided an interface to upload a restaurant menu and update the restaurant menu at any given time;

a client computer that interfaces with the server computer via a remote network connection;

wherein the client computer displays a user interface to obtain information regarding a consumer; and the consumer places an order to purchase a food item from one or more of the restaurant menus;

wherein while the consumer is placing an order, the server computer is configured to prompt the consumer to purchase an additional item related to the food item; and wherein before the consumer order is completed, to identity the user at pick up time, the user interface is configured to obtain details regarding a consumer vehicle that the consumer will use to pick up the food item from the restaurant; and a vendor point of sale system, at a specific location interfaces directly with the server computer for processing the consumer order; wherein the vendor point of sale system directly accepts the consumer order, directly transmits the order to a kitchen that prepares the food item and transmits a response to the server computer notifying that the order has been accepted.

9. The system of claim 8, wherein while the consumer is ordering a food item and if the consumer has only ordered an entrée and not an appetizer, the server computer via the user interface is configured to prompt the consumer to order an appetizer.

* * * * *